United States Patent Office 2,727,009
Patented Dec. 13, 1955

2,727,009
ANTIFOAM COMPOSITIONS AND METHOD OF FOAM INHIBITION

Myron J. Jursich, Chicago, Ill., assignor to National Aluminate Corporation, Chicago, Ill., a corporation of Delaware No Drawing. Application May 22, 1952,
Serial No. 289,443

9 Claims. (Cl. 252—321)

This invention relates to new and improved antifoam compositions and to a new and useful method of preventing, reducing or inhibiting foaming in aqueous systems, more particularly in industrial processes and especially in the manufacturing of sugar from sugar beets.

The modern sugar manufacturing process begins with floating sugar beets into the plant, washing them and slicing them into thin strips called "cossettes." These cossettes are then conveyed into a diffusion battery, which consists of a series of round closed tanks or "cells" connected in such a manner that warm water is circulated around the cossettes and from one cell to another beginning with the cell which contains the most nearly exhausted cossettes. This liquid is finally drawn off as diffusion juice from the cell to which the newest cossettes were added. The diffusion juice is then limed and carbonated until most of the lime has been precipitated as calcium carbonate, this treatment making it possible to remove by filtration the major portion of the coloring matter and many of the non-sugars that were diffused from the cossettes. The calcium carbonate and other solids are also removed by filtration and the filtrate again treated with carbon dioxide to insure the complete removal of lime. Treatment with sulfur dioxide and another filtration produce a clear, colorless juice which is concentrated in a battery of vacuum evaporators. The concentrated syrup containing about 60% sugar is treated with sulfur dioxide gas, filtered and sent to vacuum pans for crystallization. The crystallization step is controlled to attain the desired crystal grain size and the mixture of crystals and surrounding juice is then discharged into a mixer over the centrifugals. Here the crystals are separated from the liquor, washed with hot water to remove the remaining syrup and then sent to the granulator. The syrup separated by the centrifugal machines is further processed to the point where sugar can no longer be crystallized economically from the syrup and then marketed as molasses.

In the foregoing process, foaming is a severe problem in several of the stages described. Thus, foaming occurs in the diffusion battery cells, in the liming and carbonation steps, in the sulfurizing process and finally in the evaporization stage.

In general, the foaming tendencies of liquors undergoing treatment in the various sugar manufacturing processes is detrimental to efficient operation, resulting in reduced production capacity and non-effective use of equipment due to the necessity of allowing for large void spaces in liming tanks and the like. In the past it has been found that these foaming tendencies can be abated to some extent by the use of vegetable oils, such as cocoanut oil, which is added to the liquors in small quantities at various points in the process.

Recent practice has involved the use of a composition consisting of a fatty acid in conjunction with a hydrocarbon. However, the use of such compositions is not completely effective in suppressing foaming action and even where these compositions are effective they do not have a sustained suppressing action. In addition, such compositions are relatively expensive, particularly when used in sufficient amounts to substantially inhibit foaming. Moreover, such compositions are generally suitable for the control of foaming in only one or more steps in the sugar manufacturing process, but are unsuitable for use throughout the process, becase of their ineffectiveness when so used.

The antifoams of the prior art are also unsatisfactory in other respects. Many of them are subject to absorption and deactivation by the sugar beet cossettes, thus rendering them objectionable. In addition, such compositions are immiscible with water, and require dilution with oils before addition to the foaming system, thus rendering the treatment expensive and toxic to the sugar process. Finally, the addition of oil for the purpose of solubilizing the defoaming agent is objectionable because it results in boiler contamination where condensate from the sugar evaporators is used for boiler feed water.

It is an object of the present invention to provide a composition which will effectively eliminate foam in liquors undergoing treatment in sugar manufacturing processes, and which will also have a sustained action in suppressing formation of foam.

Another object of the invention is to provide a defoaming composition and process which can be used in the presence of lime, without producing an undesirable soap reaction or saponification.

Another object of the present invention is to provide a defoaming composition which is miscible with water, such compositions being suitable for use in sugar evaporators without the attendant difficulty of contaminating the boiler where evaporator condensate is used as boiler feed water.

A further object of the invention is to provide a defoaming composition which is effective in controlling foam when used in smaller dosages than has heretofore been possible with known defoaming compositions.

Still a further object of the invention is to provide a defoaming composition, which is not subject to absorption and deactivation by the sugar cossettes, thus rendering it more effective for the purposes of the invention. Other objects and purposes of the invention will appear from the following description.

In accordance with the invention new and improved defoaming compositions are prepared consisting essentially of lecithin, polyoxyethylene glycol 400 dilaurate and preferably a high molecular weight water insoluble polyoxypropylene diol or a monoether or diether thereof having a molecular weight of at least 400, preferably within the range of 400 to 3,000, all dissolved in a water immiscible hydrophobic liquid, the components of said compositions being employed in proportions sufficient to form a clear solution and the resultant product being self-emulsifiable in water.

The following compositions illustrate the preferred proportions of the aforesaid components for the purpose of the invention:

Composition A

| Ingredients: | Percent by weight |
|---|---|
| Lecithin | 25 |
| Ucon LB 1715 (Carbide & Carbon Chemicals Corporation) | 10 |
| Polyoxyethylene Glycol 400 Dilaurate | 10 |
| Mineral Seal Oil | 55 |

Composition B

| Ingredients: | Percent by weight |
|---|---|
| Lecithin | 21.8 |
| Ucon LB 1715 (Carbide & Carbon Chemicals Corporation) | 8.7 |
| Polyoxyethylene Glycol 400 Dilaurate | 8.7 |
| Kerosene | 13 |
| Mineral Seal Oil | 47.8 |

In the foregoing compositions the lecithin is a commercial grade of lecithin. Ucon LB 1715 is the monobutyl ether of a polyoxypropylene diol having a molecular weight of approximately 2000 to 2100 derived by the addition of 1,2-propylene oxide to butyl alcohol. The polyoxyethylene glycol 400 dilaurate is a diester made by esterifying polyoxyethylene glycol having a molecular weight of approximately 400 with lauric acid in the proportions of about one mol of glycol to two mols of lauric acid. The lauric acid used for the esterification can be a commercial lauric acid derived from cocoanut oil and containing $C_8$, $C_{10}$, $C_{12}$, and $C_{14}$ acids.

The invention will be further illustrated but is not limited by the following examples.

EXAMPLE I

The invention was employed in a sugar mill where sugar beets were being processed using batch process diffusion batteries. The addition of 25 parts of Composition B per million parts of the sugar containing solution to the battery measuring tank not only gave protection in the measuring tank but controlled foam during the liming stage where it was formerly necessary to use additional amounts of other antifoams to accomplish the same result.

EXAMPLE II

The invention was employed in a sugar mill where sugar was being made from sugar beets in a new 21-cell continuous type diffusion battery. The addition of 25 parts per million of Composition B to only two of the cells resulted in the control of foaming action equivalent to that obtained when 50 parts per million of older type antifoams were used in three cells. Similar results were obtained in the carbonation tank and evaporation stage, the addition of a small amount of the antifoam composition of the present invention giving striking control of foaming in these processes when compared with the control obtained with larger additions of older type antifoams. The addition of the preferred composition to the sulfurizing process eliminated foam and suppressed its formation during subsequent filtering operations.

EXAMPLE III

In many sugar plants the molasses rejected in the sugar process is further treated by the "Steffen" process in which the molasses is diluted and limed, heated and precipitated tricalcium sucrate removed in a filter, and the filtrate returned to the main process. In this process foaming is a major problem and it was found that 7 to 10 parts per million of Composition B added drop-wise to the measuring tank would effectively control the foaming whereas from 50 to 100 parts per million of other antifoams were formerly required to obtain effective control.

EXAMPLE IV

In a process of making a fatty acid soap emulsified latex from a butadiene-styrene copolymer (GR–S) foaming occurred when live steam and a 24-inch vacuum were applied to the latex during the formation stage. The addition of Composition B at a dosage of 0.1% based on the weight of the copolymer prevented the foaming.

EXAMPLE V

In a beet sugar process a dosage of approximately 28 parts per million of Composition B based on about 2200 tons of sugar beets per 24 hours was effective in preventing foaming with four points of application, namely, two cells, the filter presses ahead of the liming station and the juice leaving the cossette presses.

In the above described treatments the amount of the preferred composition which is to be added depends to some extent upon the severity of the foaming condition to be remedied. However, in general, in sugar beet processes the addition of the composition in amounts of 25 parts per million in the batteries, 50 parts per million in the liming, sulfurizing and evaporation stages and 100 parts per million in the carbonation stage is sufficient to give efficient and prolonged control of foaming.

It will be understood that the compositions of the invention are applicable to other processes in order to reduce, inhibit or eliminate foaming in aqueous systems. Such processes include the processes described in the foregoing examples, as well as the manufacture of water emulsion paints, the concentration of waste sulfite liquors and other industrial processes involving aqueous systems where foaming is a factor.

If any of the components of the previously described foaming composition are omitted the effectiveness is greatly reduced or lost. If the proportions are changed from the optimum proportions given, the effectiveness of the composition is reduced. It will be understood, however, that some change will be made in the proportions without departing from the scope of the invention.

In the practice of the invention good results have been secured by using a composition containing about 21% to about 25% by weight of lecithin, 0% to 25% by weight of a compound from the group consisting of polyoxypropylene diols having a molecular weight of at least 400 and the monoethers and diethers thereof in which the terminal ether group contains not more than 7 carbon atoms, about 5% to about 20% by weight of polyoxyethylene glycol 400 dilaurate and the remainder a water immiscible hydrophobic liquid solvent in which the other ingredients of the composition are freely miscible. In the preferred compositions the hydrophobic liquid solvent is preferably mineral seal oil or a mixture of kerosene and mineral seal oil, the preferred proportions of the solvent based on the weight of the total composition being from 0 to 15% kerosene and 47 to 55% mineral seal oil.

The lecithin employed for the purpose of the invention is preferably a natural crude lecithin product specially treated to produce a more fluid and easily handled product. In this form the product is only slightly water soluble. Other forms of lecithin may be employed in the practice of the invention.

The polyoxypropylene diol or derivative thereof may be any of the normally liquid, water insoluble, polyoxypropylene diols and monoethers and diethers thereof made from 1,2-propylene oxide and having a molecular weight of at least 400, preferably 400 to approximately 3000. These compounds are commercially available and have previously been used as lubricants. Typical examples are Ucon LB 65, Ucon LB 135, Ucon LB 165, Ucon LB 285, Ucon LB 385, Ucon DLB 47E, Ucon DLB 67E, Ucon DLB 50X, Ucon DLB 200B, Ucon DLB 265BX, Polypropylene glycol 1000, Polypropylene glycol 2025 (all Carbide and Carbon Chemicals Corporation) and Polyglycol P3000 (Dow Chemical Company). The Ucon LB series are monobutyl ethers of a polyoxypropylene diol made by reacting 1,2-propylene oxide with butyl alcohol. These compositions are normally liquid and the numbers indicate varying viscosities. Ucon LB 60 has a molecular weight of about 400. Ucon LB 1700 (1715) has a molecular weight of about 2000 to 2100. The other Ucon LB compounds listed have intermediate molecular weights. The Ucon DLB series are dibutyl ethers of polyoxypropylene diols. Diethers which are useful for the practice of this invention are also described in U. S. Patent No. 2,520,612. Polypropylene glycol 1200 is a diol made from 1,2-propylene oxide and having a molecular weight of about 1200. Polypropylene glycol 2025 is similar but has a molecular weight of about 2025. Polyglycol P 3000 is a polyoxypropylene glycol having a molecular weight of about 3000. Although the butyl ethers of polyoxypropylene are given as illustrative, other ethers such as methyl, ethyl, propyl, amyl, hexyl, cyclohexyl, phenyl and benzyl monoethers of polyoxypropylene glycol, and the corresponding diethers, can be used.

Although the polyoxypropylene diols and their monoethers and diethers are preferred for the practice of the invention other polyols containing two terminal hydroxyl groups and one or more internally located hydroxyl groups, and their ethers having terminal ether groups, can be employed. As examples of these latter compounds there may be mentioned Polyglycol 88–2 which has a viscosity of 1375 centistokes at 100° F. This is a product made by Dow Chemical Company and is an aliphatic compound having oxypropylene groups added to a single molecule having three hydroxy groups. The resultant compound is a trihydroxy compound having two terminal hydroxy groups. In general, the ethers in which the terminal ether group contains 1 to 7 carbon atoms are preferred because the introduction of more hydrophobic ether groups decreases the dispersibility or spreadability of the resultant compound on the surface of the liquid being treated. The polyoxypropylene polyols and the mono- and diethers thereof employed for the purpose of the invention preferably have a viscosity of at least 600 Saybolt seconds at 100° F.

The solvent for the other components which is water immiscible and hydrophobic is preferably a mineral oil or any other suitable solvent which is substantially free from hydrophilic groups.

The lecithin is the primary defoaming agent in the composition. The polyoxypropylene polyol or a monoether or diether thereof can be omitted from the composition in some types of antifoam usage, for instance, in the treatment by the Steffen process. However, the presence of the polyoxypropylene polyol or a mono- or diether thereof appears to be especially important in processes where sugar beet cossettes are present because these cossettes apparently tend to adsorb the active antifoam ingredients and the polyoxypropylene polyol or a mono- or diether thereof functions to prevent this adsorption. The quantity of the polyoxypropylene polyol or a mono- or diether thereof need not be more than is necessary to perform this function and the upper limit will depend upon the amount which will remain emulsified. In other words, the upper limit of the quantity of the polyoxypropylene polyol or a mono- or diether thereof should not exceed the amount which will form a homogeneous emulsion. The polyoxyethylene glycol 400 dilaurate acts as an emulsifying agent when employed in the composition with the other components and may also exhibit some defoaming activity. The kerosene, mineral seal oil and other hydrocarbon oils function chiefly as carriers, but also exhibit some activity as defoaming agents when employed in the practice of the invention.

As will be recognized by those skilled in the art the defoaming compositions of the present invention are primarily applicable in industrial processes where the temperature of the treatment may be anywhere from room temperature (say 60° to 75° F.) to the boiling point of water under atmospheric pressure.

The invention provides highly effective antifoam compositions which are easy to handle and the use of which is attended by no troublesome or injurious vapors. The employment of the invention is especially important in preventing foaming in sugar beet processing where sugar beet cossettes are present because antifoam compositions as provided by the invention, unlike many of those heretofore employed, are not subject to adsorption and deactivation by the sugar beet cossettes. Furthermore, the employment of the antifoam compositions of the present invention does not result in boiler contamination where condensates from evaporators are used for boiler feed water. Additionally, the compositions of the present invention are effective when employed in relatively small amounts.

The invention is hereby claimed as follows:

1. A defoaming composition consisting essentially of 21% to 25% by weight of lecithin, 5% to 20% by weight of polyoxyethylene glycol 400 dilaurate and 0% to 25% by weight of a compound from the group consisting of polyoxypropylene diols having a molecular weight of at least 400 and the monoethers and diethers thereof in which the terminal ether group contains not more than 7 carbon atoms, all dissolved in a water immiscible normally liquid hydrophobic solvent, the components of said composition being employed in proportions sufficient to form a solution in said solvent and the product being self-emulsifiable in water.

2. A defoaming composition consisting essentially of 21% to 25% by weight of lecithin, 5% to 20% by weight of polyoxyethylene glycol 400 dilaurate and 0% to 25% by weight of a compound which is normally liquid and has a viscosity of at least 600 Saybolt seconds at 100° F. from the group consisting of polyoxypropylene polyols having a molecular weight of at least 400 and the monoethers and diethers thereof in which the ether groups are terminal groups and contain not more than 7 carbon atoms, all dissolved in a water immiscible normally liquid hydrophobic solvent, the components of said composition being employed in proportions sufficient to form a solution in said solvent and the product being self-emulsifiable in water.

3. A defoaming composition consisting essentially of from 21% to 25% by weight of lecithin, about 8% to about 10% by weight of polyoxyethylene glycol 400 dilaurate, and about 8% to about 10% by weight of a polyoxypropylene diol monobutyl ether having a molecular weight of at least 400, all dissolved in a water immiscible hydrophobic liquid solvent.

4. A defoaming composition consisting essentially of from 21% to 25% by weight of lecithin, about 8% to about 10% by weight of polyoxyethylene glycol 400 dilaurate, and about 8% to about 10% by weight of a polyoxypropylene diol monobutyl ether having a molecular weight of about 2000 to 2100, all dissolved in a water immiscible hydrophobic liquid solvent consisting essentially of 0% to 15% by weight of kerosene and about 48% to about 55% by weight of mineral seal oil.

5. A method of defoaming aqueous liquids which are normally susceptible to foaming which comprises treating said liquids with a quantity of a defoaming composition consisting essentially of 21% to 25% by weight of lecithin, 5% to 20% by weight of polyoxyethylene glycol 400 dilaurate and 0% to 25% by weight of a compound from the group consisting of polyoxypropylene diols having a molecular weight of at least 400 and the monoethers and diethers thereof in which the terminal ether group contains not more than 7 carbon atoms, all dissolved in a water immiscible normally liquid hydrophobic solvent, the components of said composition being employed in proportions sufficient to form a solution in said solvent and the product being self-emulsifiable in water, said quantity being sufficient to substantially prevent foaming.

6. A method of defoaming aqueous liquids which are normally susceptible to foaming which comprises treating said liquids with a quantity of a defoaming composition consisting essentially of from 21% to 25% by weight of lecithin, about 8 to about 10% by weight of polyoxyethylene glycol 400 dilaurate, and about 8% to about 10% by weight of a polyoxypropylene diol monobutyl ether having a molecular weight of at least 400, all dissolved in a water immiscible hydrophobic liquid solvent, said quantity being sufficient to substantially prevent foaming.

7. A method of reducing foaming in aqueous liquids containing sugar beets which comprises treating such liquids with a quantity of a defoaming composition consisting essentially of 21% to 25% by weight of lecithin, 5% to 20% by weight of polyoxyethylene glycol 400 dilaurate and up to 25% by weight of a compound which is normally liquid and has a viscosity of at least 600 Saybolt seconds at 100° F. from the group consisting of polyoxypropylene polyols having a molecular weight of at least 400 and the monoethers and diethers thereof in which the ether groups are terminal groups and contain not more than 7 carbon atoms, all dissolved in a water immiscible normally liquid hydrophobic solvent, the components of said composition being employed in proportions sufficient to form a solution in said solvent and the resultant product being self-emulsifiable in water, said quantity being sufficient to substantially prevent foaming.

8. A method of reducing foaming in aqueous liquids containing sugar beets which comprises treating such liquids with a quantity of a defoaming composition consisting essentially of from 21% to 25% by weight of lecithin, about 8% to about 10% by weight of polyoxyethylene glycol 400 dilaurate, and about 8% to about 10% by weight of a polyoxypropylene diol monobutyl ether having a molecular weight of at least 400, all dissolved in a water immiscible hydrophobic liquid solvent, said quantity being sufficient to substantially prevent foaming.

9. A method of reducing foaming in the emulsification of butadiene-styrene copolymers which comprises emulsifying said copolymers in water in the presence of approximately 0.1% based on the weight of the copolymer of a defoaming composition consisting essentially of from 21% to 25% by weight of lecithin, about 8% to about 10% by weight of polyoxyethylene glycol 400 dilaurate, and about 8% to about 10% by weight of a polyoxypropylene diol monobutyl ether having a molecular weight of about 2000 to 2100, all dissolved in a water immiscible hydrophobic liquid solvent consisting essentially of 0% to 15% by weight of kerosene and about 48% to about 55% by weight of mineral seal oil.

References Cited in the file of this patent

UNITED STATES PATENTS

| | | |
|---|---|---|
| 2,575,276 | Jacoby et al. | Nov. 13, 1951 |
| 2,668,150 | Luvisi | Feb. 2, 1954 |

FOREIGN PATENTS

| | | |
|---|---|---|
| 715,109 | Germany | Dec. 16, 1941 |

OTHER REFERENCES

Esters by Glyco, Glyco Products Co., N. Y. (1949), pages 10, 14 and 15.